INVENTORS
DONALD H. BAKER
CECIL A. HALL
BY
ATTORNEY

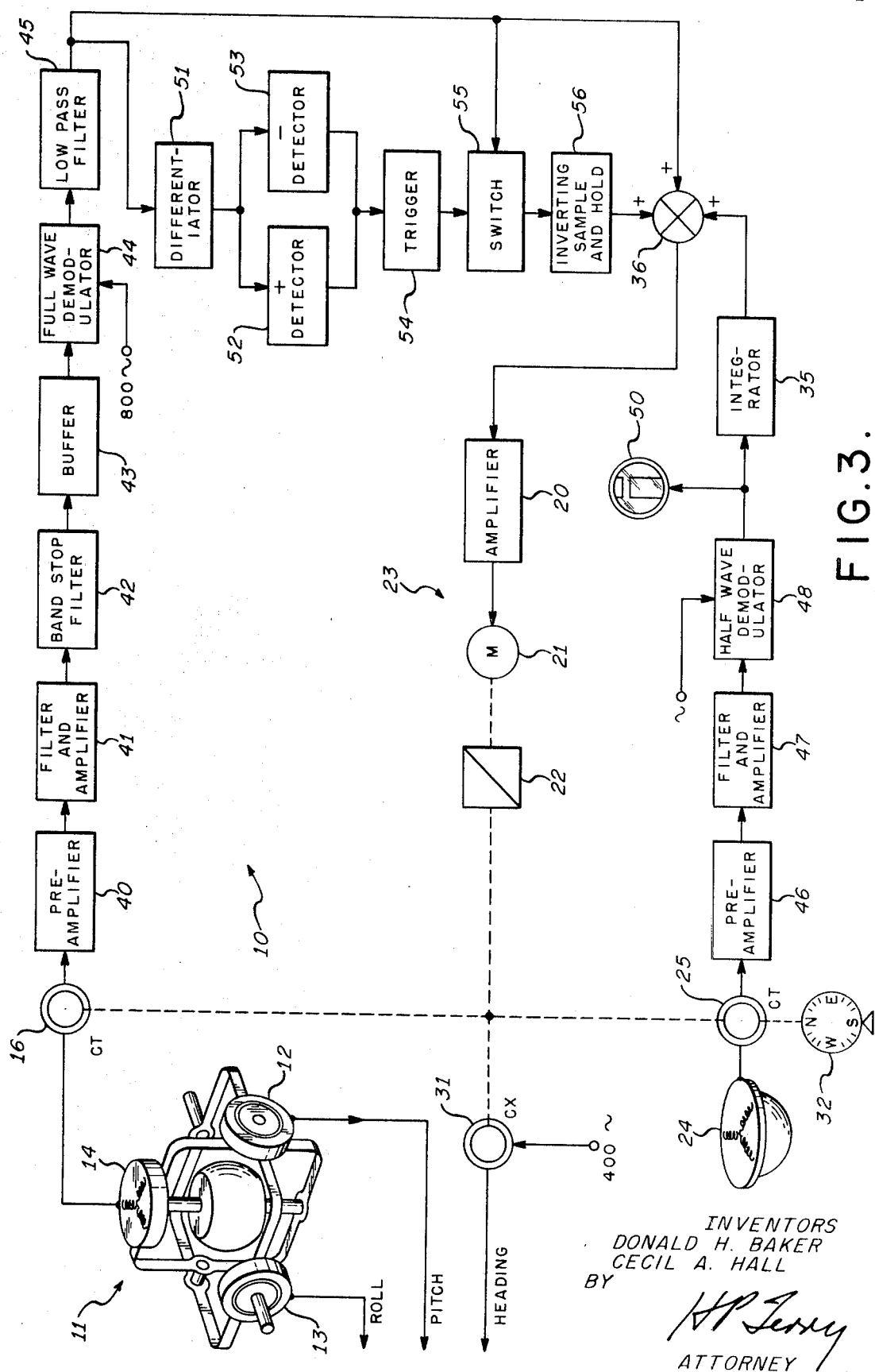

United States Patent Office 3,583,074
Patented June 8, 1971

3,583,074
THREE AXIS REFERENCE SYSTEM FOR
NAVIGABLE CRAFT
Donald H. Baker and Cecil A. Hall, Phoenix, Ariz.,
assignors to Sperry Rand Corporation
Filed Dec. 11, 1968, Ser. No. 783,073
Int. Cl. G01c 17/00, 17/30
U.S. Cl. 33—222
9 Claims

ABSTRACT OF THE DISCLOSURE

A three axis reference system for mounting on a craft which includes a vertical gyroscope for providing signals representative of the pitch and roll attitudes of the craft with a magnetic field detector stabilized on the vertical gyroscope to provide short-term heading signals. Another magnetic field detector is remotely located to provide long-term heading signals. The short and long-term heading signals are combined to provide an accurate compensated azimuthal signal.

BACKGROUND OF THE INVENTION

Field of the invention

The invention pertains to three axis reference systems for navigable craft for providing information with respect to pitch, roll and heading of the craft.

Description of the prior art

The prior art with respect to gyromagnetic compass systems is characterized generally by one type of system as disclosed in U.S. Pat. 2,361,433 entitled "Magnetic Compass," invented by A. A. Stuart, Jr. in which a magnetic field detector is stabilized on a vertical gyroscope. In this type of system, the stabilized magnetic field detector is subject to errors attributable to the vertical gyroscope's inability to precisely define the horizontal and magnetically induced errors caused by magnetic disturbances in the craft proximate the detector. In order to overcome the latter errors, the entire unit was mounted in a wing or other area in the aircraft relatively free of such disturbances. However, with the advent of modern thin wing aircraft this expedient becomes increasingly difficult in that the combined vertical gyroscope and stabilized detector can no longer be mounted in a remote section of the aircraft such as the wing or fin where it was usually mounted because of space considerations but must be located in the fuselage where it is subject to the aforementioned magnetic disturbances. As stated, systems utilizing a gyro stabilized detector were also subject to long term errors due to the long term erection characteristics of the stabilizing gyro, especially after accelerated flight of the aircraft.

The other conventional system is characterized by U.S. Pat. 2,357,319 entitled "Flux Valve Magnetic Compass" invented by O. E. Esval et al. assigned to the same assignee as the present invention. Systems of this type, utilizing a remotely mounted, pendulous flux valve are subject to short term errors during aircraft maneuvers which are usually overcome by some form of flux valve cutout device. This type of system also required a directional gyroscope for short period heading information and during turns an error known as gimbal error appeared in the heading output signal.

SUMMARY OF THE INVENTION

The present invention utilizes a magnetic field detector stabilized by a vertical gyroscope, which may be mounted at any convenient location in the aircraft fuselage, to provide a short term heading signal while a similar magnetic field detector mounted in an aircraft location substantially free of magnetic disturbances provides a long term heading signal. Thus, the remotely mounted magnetic field detector being relatively small can be mounted in the most desirable location in an aircraft, for example, at the extremity of a thin wing or vertical stabilizer while the vertical gyroscope with its stabilized short term heading detector is mounted where convenient in the aircraft fuselage. By utilizing the desirable features of both of the aforementioned systems, the objectionable features of each are minimized thereby providing an accurate heading signal at relatively low cost. The fuselage mounted heading detector provides accurate short term heading information because the data is measured in the horizontal plane by virtue of being stabilized by the vertical gyroscope. The short term heading data is more accurate during banked turns because there is no gimbal error.

Even in a vertical gyroscope of reasonable accuracy, there may be verticality errors in the order of one-quarter degree which will cause the flux valve mounted thereon to sense a portion of the vertical component of earth's magnetic field which in the mid-latitude regions of the earth can be relatively large and which thereby induces a heading error in the flux valve output of as much as three-quarters of a degree. The remotely located flux valve will readily compensate this error on a long term basis. Further, short term magnetic disturbances associated with turning on and off electrical equipment in the fuselage area may be readily compensated by means of transient detection and cancellation techniques.

BRIEF DESCRIPTION OF THE DRAWINGS

FIG. 3 is a schematic diagram, partially in block form, showing greater details of the embodiment of the three axis reference system shown in FIG. 2.

DESCRIPTION OF THE PREFERRED EMBODIMENTS

Figure 1:
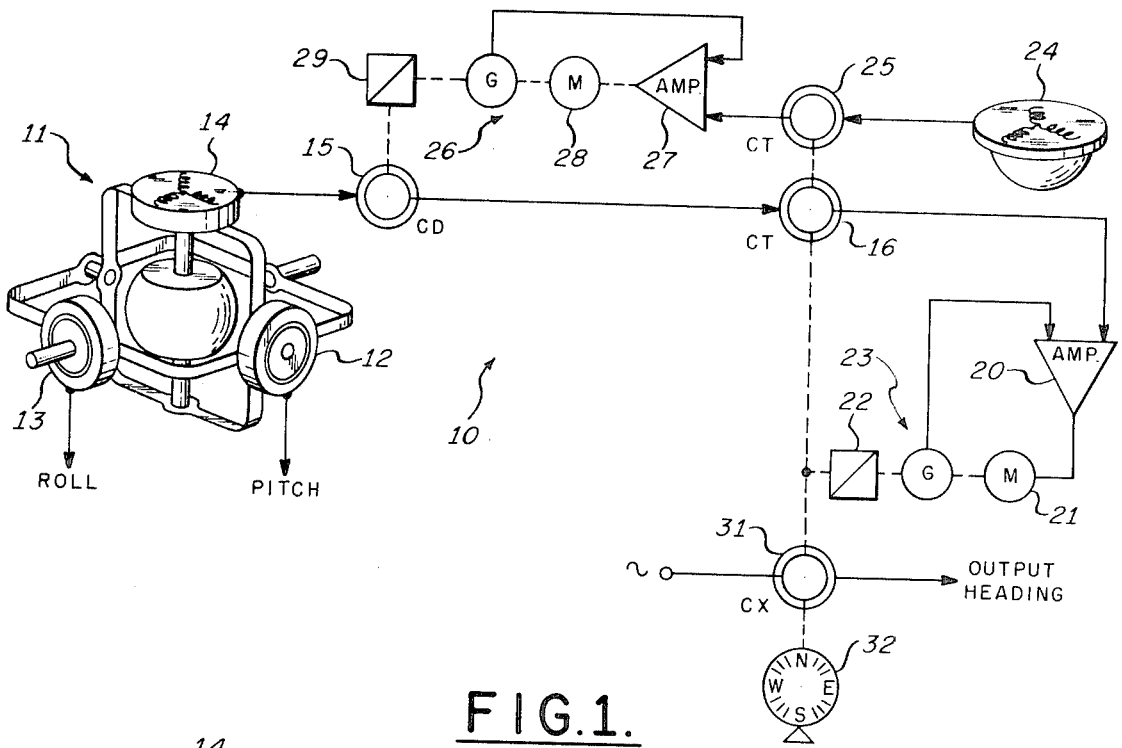
FIG. 1 is a schematic diagram of a three axis reference system incorporating the present invention.

Referring to FIG. 1, the three axis reference system 10 of the present invention includes a vertical gyroscope 11 adapted for mounting on a navigable craft such as an aircraft (not shown). The vertical gyroscope 11 has pick-offs 12 and 13 for providing pitch and roll signals, respectively, representative of the pitch and roll attitude of the aircraft. The vertical gyroscope 11 is erected by conventional means such as liquid levels and torquing devices not shown for purposes of simplicity. A magnetic field detector in the form of a flux valve 14 is mounted on the inner gimbal of the gyroscope 11 and, by virtue of such mounting, it is stabilized to provide proper sensing of the magnetic heading since the flux valve 14 will remain horizontal even during turns and/or accelerations and therefore always senses only the horizontal component of the earth's magnetic field. The output of the flux valve 14 is connected via a synchro differential 15 to a synchro control transformer 16. The error signal from the control transformer 16 is connected to an amplifier 20 which drives the control transformer 16 to null through a servomotor 21 and a gear train 22. This servo loop 23 is a high gain or fast response loop positioning compass card 32 rapidly in accordance with short term yawing of the craft.

The servo loop 23 thus rapidly repeats the heading sensed by the stabilized flux valve 14. However, large azimuthal errors can be present due to the existence of ferrous material proximate the fuselage mounted vertical gyroscope 11 and also due to the sensing of a portion of the vertical component of the earth's magnetic field which may result due to pitch and roll errors, i.e., verticality errors, of the vertical gyroscope 11. In accordance with the teachings of the present invention, the aforementioned long term errors are compensated by means of a remotely disposed flux valve 24. The flux valve 24 may comprise a conventional pendulous flux valve which is mounted in an area that is relatively free from local magnetic fields such as the extremity of a wing tip or vertical stabilizer of an aircraft. The heading signal sensed by the flux valve 24 is thus very accurate on a long term basis but may exhibit instantaneous or short term errors due to maneuvers of the aircraft.

The output of the flux valve 24 is supplied to a control transformer 25 positioned by fast response servo 23. Any error signal at the output of control transformer 25 is removed by positioning differential 15 via a servo loop 26 comprising an amplifier 27, motor 28 and gear train 29. The servo loop 26 is a low gain or slow response loop, the gear train being selected to provide a slaving rate of approximately 5° per minute for example, which corresponds generally to the slaving rate of a conventional gyromagnetic compass system utilizing a directional gyro as a short-term reference as taught in said Esval et al. patent. The differential 15 is thus arranged to rotate slowly in a sense to position CT 25 and hence compass card 32 accurately to the average magnetic heading of the aircraft as sensed by the remote flux valve 24 through the servo 26. When this is achieved, the synchro transmitter 31 and indicator 32 will provide accurate short and long term signals representative of the magnetic heading of the craft. The foregoing arrangement thus provides both short and long term heading signals without the requirement of a directional gyroscope.

Figure 2:
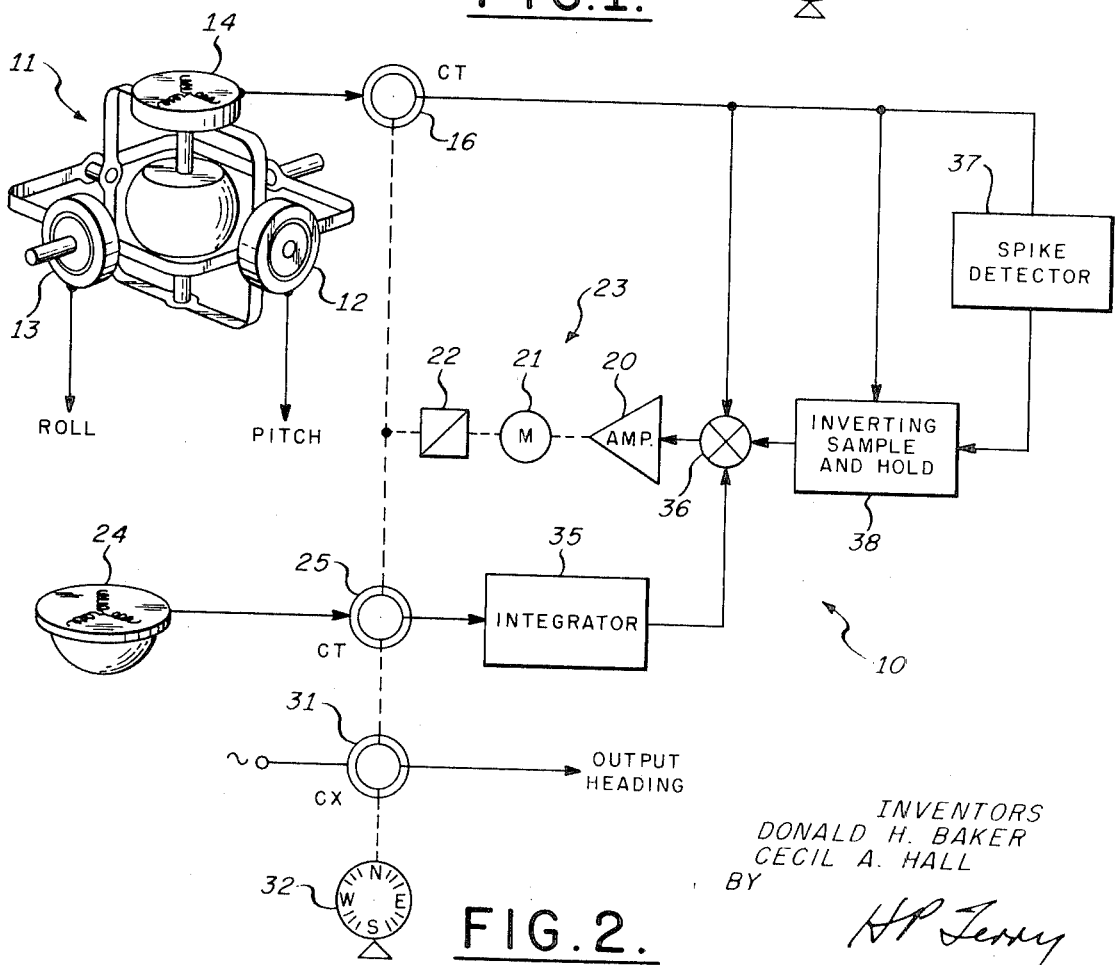
FIG. 2 is a schematic diagram of an alternative embodiment of a three axis reference systems incorporating the present invention.

Referring now to FIG. 2, wherein like elements will be indicated by like reference characters, the stabilized flux valve 14 is connected directly to the control transformer 16 and drives the servo 23 via amplifier 21 and gear train 22 to provide a fast response or high gain loop for maneuvering flight. The output of the remotely located flux valve 24 is connected to the control transformer 25 which provides an error signal to an integrating circuit 35. The output of the integrator 35 is compared with the output of the control transformer 16 in an algebraic summation device 36. The gain of the remote flux valve signal chain is large compared with that of the gyro stabilized flux valve signal chain, for example, about 40 to 1. The purpose of the integrator 35 is to limit control by the remote flux valve 24 to a rate of a few degrees per minute corresponding to the slaving rate of a conventional gyromagnetic compass system. Rate stabilization of the type disclosed in FIG. 1 is optional depending upon system parameters.

In the event the stabilized flux valve 14 is mounted in an area in which there are transient magnetic field changes such as found in many aircraft fuselage locations, they may be compensated in a manner to be explained. These field changes may be caused, for example, by the actuation of D.C. operated equipment in the vicinity of the stabilized flux valve 14 and may be reflected in a transient operation of the servo 23 to the detriment of apparatus coupled to the system, such as an automatic pilot. Since the primary source of step function magnetic field changes is a stray field at the vertical gyroscope location, this problem can be eliminated by making the system 10 insensitive to step functions by the action of a spike detector 37 in conjunction with an inverting sample and hold circuit 38. The output of the control transformer 16 is connected to the spike detector 37 and the inverting sample and hold circuit 38 such that the spike detector 37 senses the presence of a step function and triggers the circuit 38 which supplies the inverted signal to the summation device 36. This prevents the step change from driving the servo 23. As the output from the sample and hold circuit 38 decays, it is replaced by the output of the integrator 35 in the normal slaving loop. The reaction time of the spike detector 37 and the inverting sample and hold circuit 38 is arranged to be short compared to the time constant of the servo 23 thereby preventing significant undesirable motion of the servo 23.

Referring now to FIG. 3, a more detailed explanation of the present invention will now be provided with like elements being indicated by like reference characters. The aircraft's magnetic heading is sensed by the flux valve 14 and supplied to the control transformer 16, the output of which is amplified in a pre-amplifier 40, further amplified and filtered in a filter and amplifier circuit 41 to remove high harmonics typically present in flux valve signals, and then filtered by a 400 Hz. notch bandstop filter 42 to highly attenuate any 400 Hz. component. A buffer amplifier 43 is responsive to the output of the filter 42 to in turn provide an output that is a well defined low noise 800 Hz. signal that is full wave demodulated by a demodulator 44. Any ripple on the demodulator output is removed by a lowpass filter 45.

In operation, the aircraft's magnetic heading as sensed by flux valve 14, is supplied to the control transformer 16 of closed loop servo 23. The control transformer 16 is immediately driven to a null by the servo loop elements 40 through 45, summing device 36 and elements 20 through 22. The synchro transmitter 31 is positioned by the servo loop 23 to provide aircraft magnetic heading as an output. The remote flux valve 24 also senses the aircraft's magnetic heading and if there is no error in either the flux valve 14 or the remote flux valve 24 outputs, then their outputs agree and the control transformer 25 will be nulled by the same servo action that nulled the control transformer 16.

However, the flux valve 14 can be in error due to such causes as ferrous materials in the vicinity of the vertical gyroscope 11 or the vertical gyroscope having roll and pitch errors that cause the flux valve 14 to sense a portion of the vertical component of the earth's magnetic field. Such errors present in the flux valve 14 are of a long term nature and do not affect its short term accuracy, the latter components positioning servo 23 accordingly and providing short term heading information at compass card 32 and CX 31. The pendulously mounted flux valve 24 however is not subject to the same long term errors as flux valve 14 but is subject to short term errors due to craft turns and/or accelerations. Therefore on a long term basis the control transformer 25 null may not coincide with the control transformer 16 null and hence provides an output signal.

While the control transformer 16 is driven to a null on a short term basis, a long term correction signal will be supplied by the control transformer 25. This correction signal will be an 800 Hz. signal that is amplified by a preamplifier 46, filtered to remove the undesired harmonics typically present in flux signals and further amplified by a filter and amplifier circuit 47. The signal is then converted to D.C. by a half wave demodulator 48, and integrated by an electronic integrator 35. The ramp output from the integrator 35 goes through the summing device 36, is further amplified by the amplifier 20 and drives the D.C. servo motor 21 to position the control transformer 25 through the gear train 22 to a null which positions the synchro transmitter 31 to the correct aircraft magnetic heading. The remote flux valve 24 has approximately forty times more control authority over the D.C. servo 23 than does the flux valve 14 by making the forward gain of the servo elements 25, 46 through 48 and 35 forty times more than the gain through the servo elements 16 and 40 through 45. The authority of the flux valve 24 appears as a slaving rate, as in a conventional gyromagnetic compass system, due to the action of the electronic integrator 35. The integrator 35 thus eliminates the instantaneous and short term heading errors that are present in the pendulously mounted remote flux valve 24 in the same manner as the directional gyro does in the conventional compass system. An annunciator 50 monitors the input to the integrator 35 to provide a visual indication of system synchronization.

Another error that can be present in the flux valve 14 is caused by the earth's magnetic field disturbances due to D.C. operated equipment in the vicinity of the fuselage mounted flux valve 14. Errors from constant, non-changing, D.C. currents would be slaved out of the system in the manner described above. However, D.C. operated equipment may be turned on and off at any time, causing the abrupt magnetic disturbances to appear or disappear substantially instantaneously. This causes the output of the flux valve 14 to produce heading transients and hence rapid or jerky motion of indicator 32 and transmitter 31. Heading transients in the flux valve 14 output are eliminated by elements 51 through 56, in a manner to be explained. To accurately distinguish between high rate turns and abrupt magnetic disturbance, it is necessary to have a well defined, undistorted heading signal at the input of the differentiator 51. This is provided by the lowpass filter 45.

The heading rate is computed by the differentiator 51. Positive or negative heading rates are detected by detectors 52 and 53, respectively, and supplied to a trigger circuit 54. If the heading changes at a very high rate, such as would be produced by high frequency magnetic disturbance, the trigger 54 turns the switch 55 on thereby inserting the same heading transient from the filter 45 into the inverting sample and hold circuit 56. The inverted signal is fed to the summing device point 36 to cancel the heading transient caused by the magnetic disturbance so that this transient is not sensed by the servo amplifier 20. The response time of the servomotor loop 23 is sufficiently long to allow the necessary time for elements 51 through 56 to perform their functions. The holding function of the inverting sample and hold circuit 56 need not be perfect. As the inverted transient decays, the motor 21 will drive a very slight amount at the hold decay rate thereby building up a signal at the output of the control transformer 25 which through elements 46 to 48 and 35 will provide the necessary cancelling signal at the summing device 36.

While the invention has been described in its preferred embodiment, it is to be understood that the words which have been used are words of description rather than limitation and that changes within the purview of the appended claims may be made without departing from the true scope and spirit of the invention in its broader aspects.

We claim:

1. a three axis reference system for craft comprising:
    vertical gyroscope means adapted for mounting on said craft for providing signals representative of pitch and roll of said craft,
    first magnetic field detector means responsive to the earth's magnetic field and adapted to be stabilized by said vertical gyroscope means for providing short term heading reference signals,
    second magnetic field detector means responsive to the earth's magnetic field and adapted for remote mounting on said craft with respect to said first detector means for providing long term heading reference signals, and
    further means responsive to said short and long term heading reference signals for providing an accurate signal representative of the heading of said craft.

2. A three axis reference system of the character recited in claim 1 in which:
    a first signal loop is responsive to said first magnetic field detector means,
    and a second signal loop is responsive to said second magnetic field detector means, said second signal loop having substantially greater effectiveness than said first signal loop.

3. A three axis reference system of the character recited in claim 1 including:
    circuit holding means including spike detecting means responsive to step functions of said short term reference signals for rendering spurious step function signals ineffective.

4. A three axis reference system of the character recited in claim 1 including:
    first control transformer means responsive to said first magnetic field detector means,
    second control transformer means responsive to said second magnetic field detector means,
    and said further means includes servo means tending to drive said first and second control transformer means towards null.

5. A three axis reference system of the character recited in claim 2 in which:
    said first signal loop includes circuit holding means including spike detecting means responsive to step functions of said short term reference signals for rendering spurious step function signals ineffective,
    and said second signal loop includes integrating means.

6. A three axis reference system of the character recited in claim 4 in which:
    said first and second control transformer means are interconnected,
    and said further means includes algebraic summation means responsive to said short and long term heading reference signals and common servo means coupled between said algebraic summation means and said first and second control transformer means tending to simultaneously drive said transformer means towards null.

7. A three axis reference system of the character recited in claim 4 including:
    signal defining means including filtering means responsive to said first control transformer means for providing well defined heading signals,
    means including differentiating means responsive to said well defined heading signal for providing discrete differentiated heading signals,
    means including switching means responsive to said differentiated heading signals and to said well defined heading signals for providing inverted heading signals, and
    algebraic summation means coupled to said servo means and responsive to said well defined heading signals and to said inverted heading signals whereby spurious step function signals are rendered ineffective.

8. A three axis reference system of the character recited in claim 4 including:
    signal defining means including filtering means responsive to said first control transformer means for providing well defined heading signals,
    differentiating means responsive to said well defined heading signals for providing differentiated heading signals representative of positive or negative heading rates,
    heading rate detecting means responsive to said differentiated heading signals for providing positive or negative rate signals,
    trigger circuit means responsive to said positive or negative rate signals for providing triggering signals,
    switching means responsive to said triggering signals and to said well defined heading signals for rendering said well defined heading signals effective in the presence of said triggering signals,
    inverting and holding circuit means coupled to said switching means for providing inverted heading signals, and
    algebraic summation means coupled to said servo means and responsive to said well defined heading signals and to said inverted heading signals whereby spurious step function signals are rendered ineffective.

9. A flux valve compass system for navigable craft comprising:

a vertical gyroscope adapted to be mounted in any convenient location in an aircraft even though subject to substantially large magnetic disturbances and including a first flux valve mounted thereon and stabilized thereby whereby said first flux valve detects the horizontal component of earth's magnetic field at that location and providing an output including short term heading changes but reflecting said magnetic disturbances and long term errors associated with verticality errors of said vertical gyroscope, a second flux valve pendulously mounted remotely from said first flux valve and in an area in said aircraft substantially free of magnetic disturbances and providing an output including long term heading changes but reflecting short term errors associated with said pendulous mounting due to aircraft maneuvers, means including a high gain, high response servo loop positioned in accordance with the output of said first flux valve for providing short term magnetic heading information, and means coupled with and responsive to said second flux valve and said servo loop and including integrating means for providing long term control of said servo loop.

References Cited

UNITED STATES PATENTS

| | | |
|---|---|---|
| 2,393,974 | 2/1946 | Curry. |
| 2,659,859 | 11/1953 | Heiland. |
| 2,852,859 | 9/1958 | Depp. |
| 2,969,208 | 1/1961 | Dove. |

FOREIGN PATENTS 204,146  1/1956  Great Britain.

ROBERT B. HULL, Primary Examiner

U.S. Cl. X.R.

33—204